(12) United States Patent
Cohen

(10) Patent No.: US 12,212,220 B2
(45) Date of Patent: Jan. 28, 2025

(54) PROGRAMMABLE SWITCHING CONVERTER CONTROLLER

(71) Applicant: TEXAS INSTRUMENTS INCORPORATED, Dallas, TX (US)

(72) Inventor: Isaac Cohen, Dix Hills, NY (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/373,378

(22) Filed: Sep. 27, 2023

(65) Prior Publication Data

US 2024/0022172 A1 Jan. 18, 2024

Related U.S. Application Data

(62) Division of application No. 17/390,487, filed on Jul. 30, 2021, now Pat. No. 11,804,776.

(51) Int. Cl.
| | |
|---|---|
| *H02M 3/158* | (2006.01) |
| *H02M 1/00* | (2006.01) |
| *H02M 3/156* | (2006.01) |
| *H02M 1/08* | (2006.01) |

(52) U.S. Cl.
CPC ....... *H02M 1/0003* (2021.05); *H02M 1/0009* (2021.05); *H02M 3/156* (2013.01); *H02M 1/0032* (2021.05); *H02M 1/08* (2013.01); *H02M 3/158* (2013.01)

(58) Field of Classification Search
CPC ............ H02M 1/0003; H02M 1/0025; H02M 1/4225; H02M 1/0085; H02M 3/156; H02M 3/158; H02M 1/0032; H02M 3/1566; H02M 1/0009
See application file for complete search history.

(56) References Cited

U.S. PATENT DOCUMENTS

| | | | | |
|---|---|---|---|---|
| 7,135,841 | B1 * | 11/2006 | Tomiyoshi | ............ H02M 3/156 |
| | | | | 323/224 |
| 10,177,644 | B1 | 1/2019 | Murthy et al. | |
| 11,070,131 | B2 | 7/2021 | Liang et al. | |
| 2001/0046145 | A1 * | 11/2001 | Oknaian | ............. H02M 3/1588 |
| | | | | 363/98 |
| 2011/0075448 | A1 | 3/2011 | Melanson | |
| 2015/0097539 | A1 * | 4/2015 | Ragona | ............... H02M 3/1588 |
| | | | | 323/271 |
| 2016/0306371 | A1 | 10/2016 | Svorc et al. | |
| 2017/0237345 | A1 | 8/2017 | Manlove et al. | |
| 2022/0345043 | A1 * | 10/2022 | Krugly | ................ H02M 1/0025 |

* cited by examiner

*Primary Examiner* — Alex Torres-Rivera
(74) *Attorney, Agent, or Firm* — Charles F. Koch; Frank D. Cimino

(57) ABSTRACT

A programmable switch converter controller for a power stage with a switch, an inductor, and a diode, includes a pulse-width modulator. The pulse-width modulator is configured to: generate an on-time interval (Ton) that is fixed or proportional to a demand signal proportional to a load adapted to be coupled to an output of the power stage; generate an off-time interval (Toff) that is inversely proportional to the product of a voltage across the inductor while the switch is off and a demand signal proportional to the load; initiate Ton when Toff elapses; and initiate Ton responsive to an external trigger signal.

9 Claims, 13 Drawing Sheets

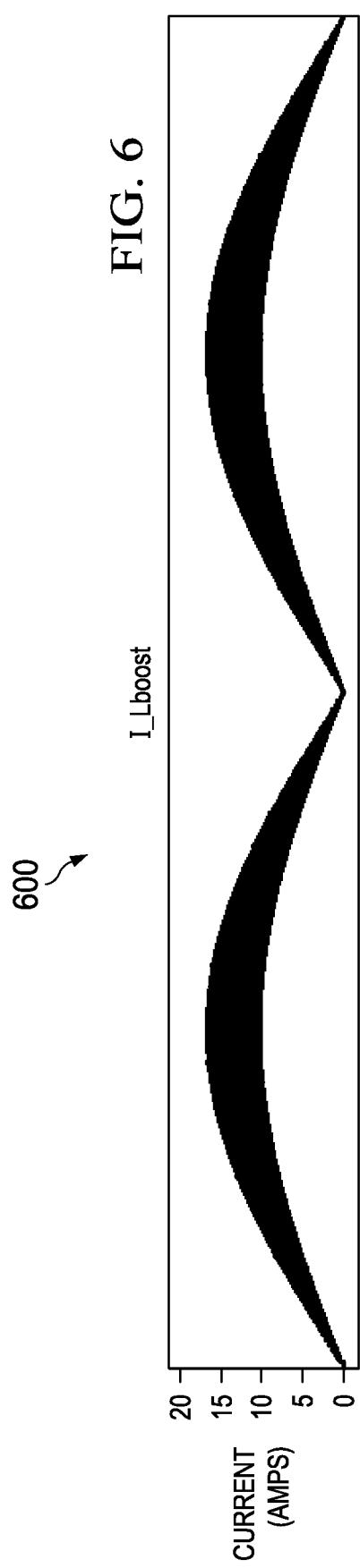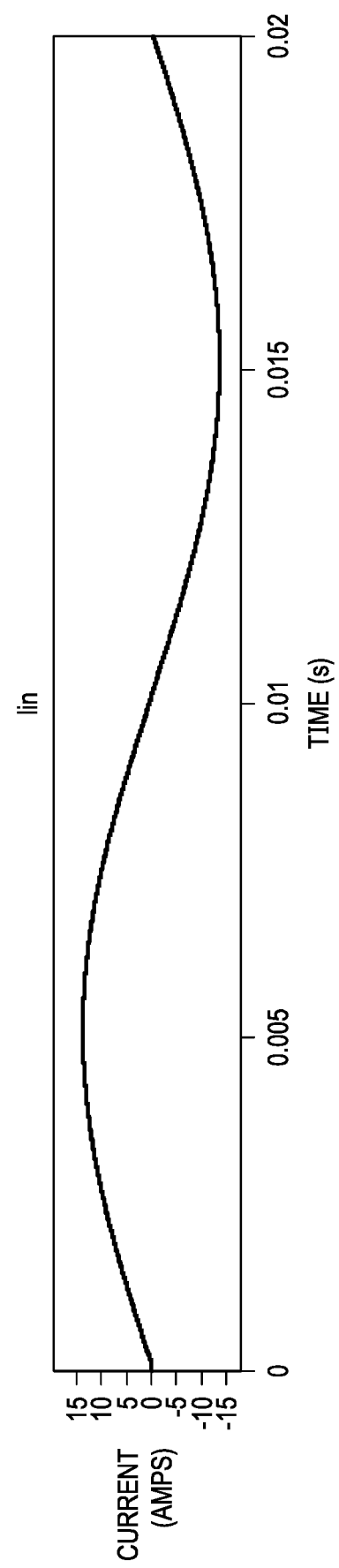
FIG. 6

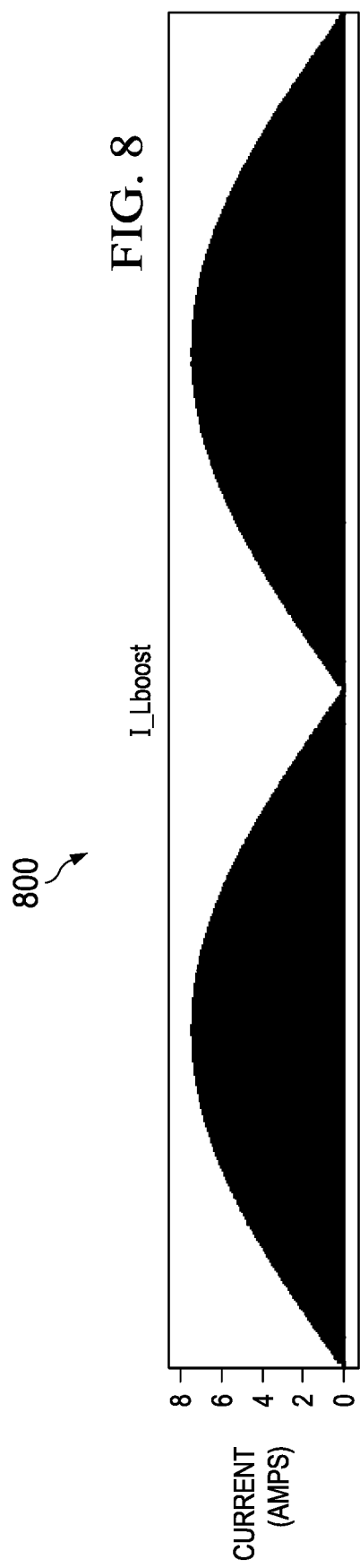
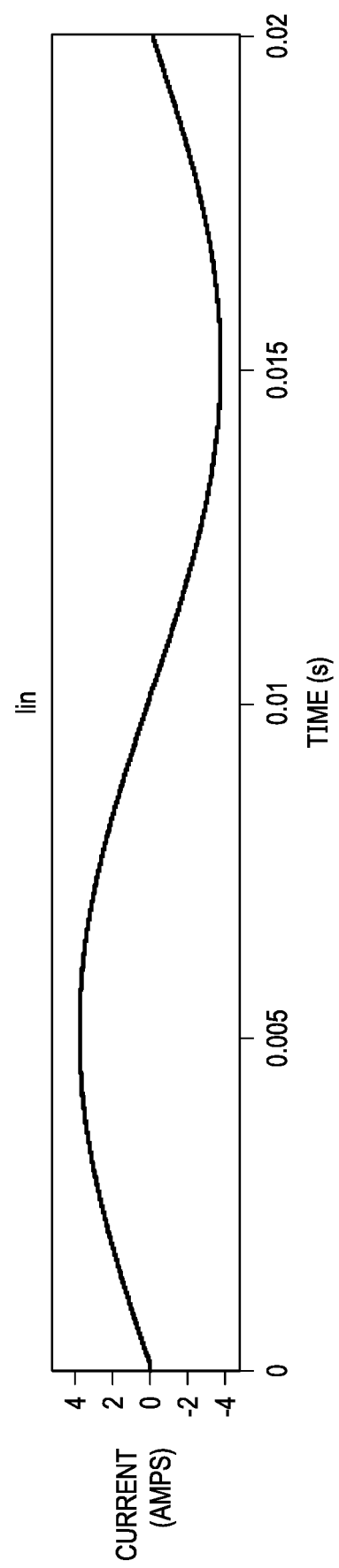
FIG. 8

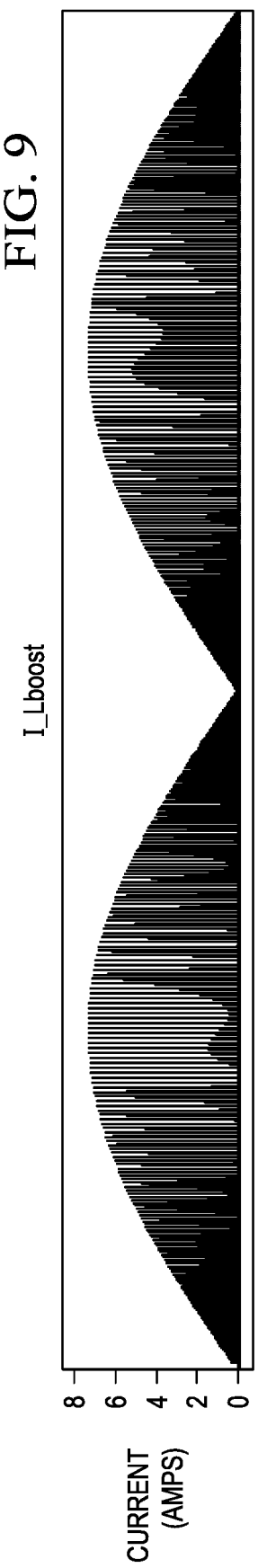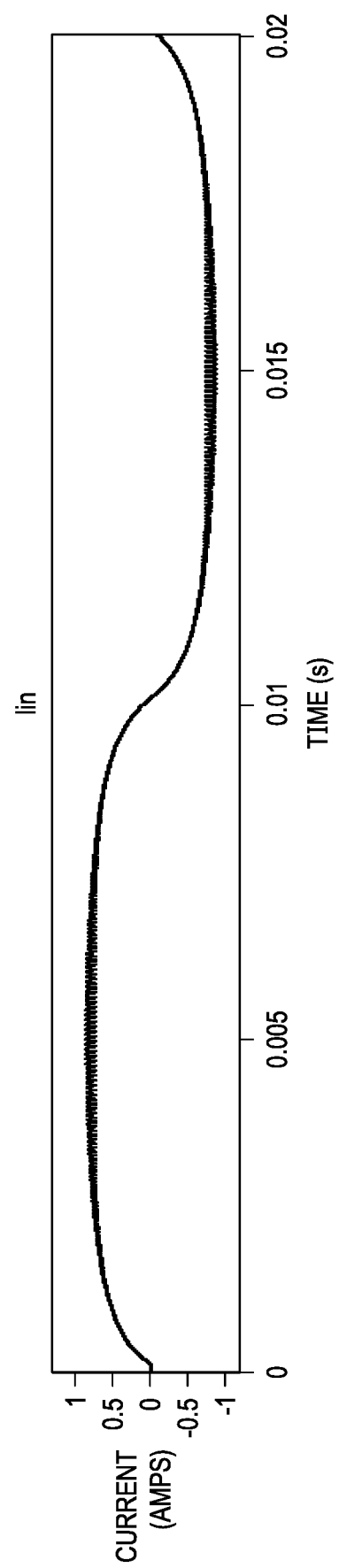
FIG. 9

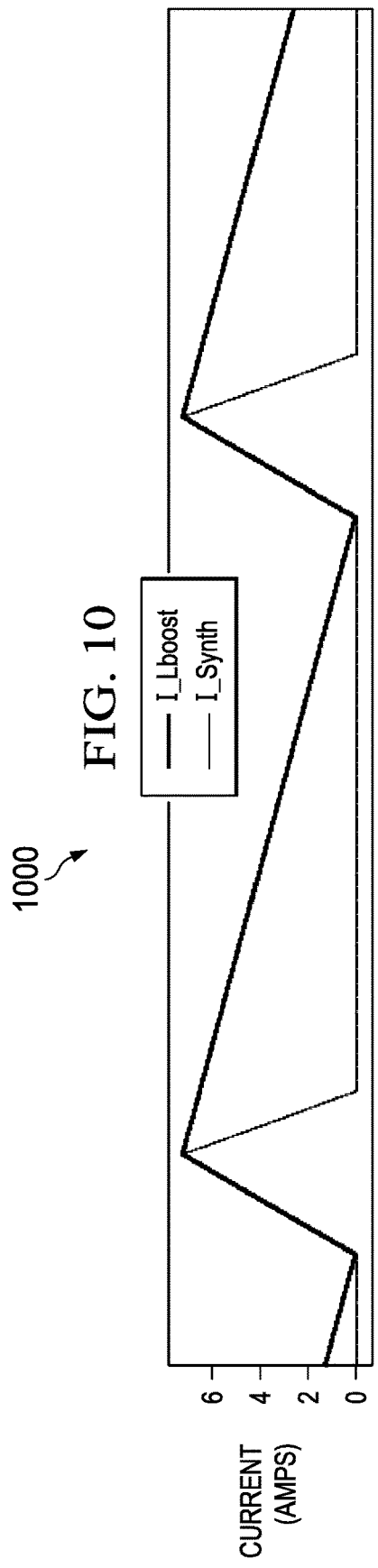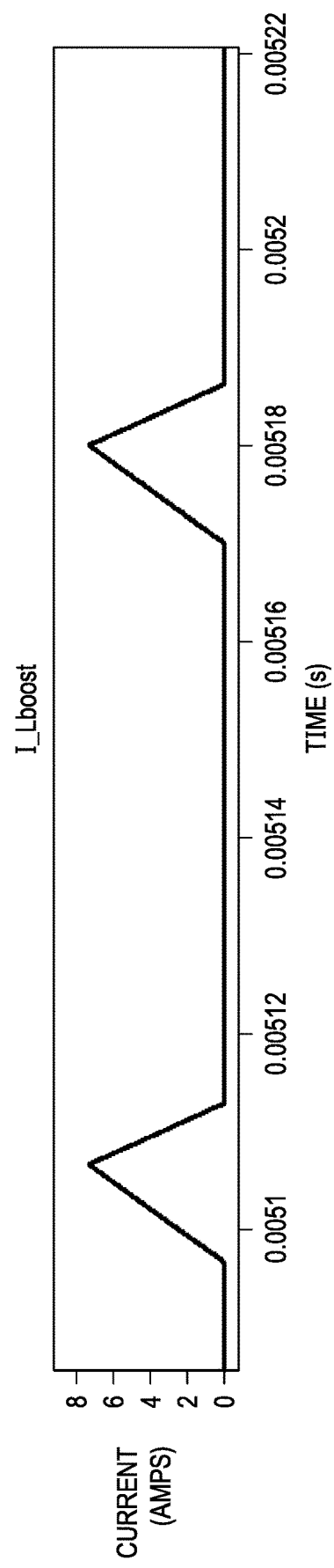
FIG. 10

PROGRAMMABLE SWITCHING CONVERTER CONTROLLER

CLAIM TO PRIORITY

This application is a divisional of U.S. application Ser. No. 17/390,487, filed Jul. 30, 2021, which is incorporated herein by reference in its entirety.

BACKGROUND

As new electronic devices are developed and integrated circuit (IC) technology advances, new IC products are commercialized. One example IC product for electronic devices is a switching converter or switching converter controller. Switching converters include a power stage and a switching converter controller to convert an input voltage to an output voltage. Depending on the type of switching converter, the output voltage may be greater than or less than the input voltage. For example, a boost converter has an output voltage greater than the input voltage, a buck converter has a output voltage less than the input voltage, and a buck-boost converter has an output voltage that is greater than or less than the input voltage. The switching converter controller is responsible for controlling any power switches of the power stage so as to maintain regulation of a target output voltage.

There are many power stage and switching converter controller topologies. The various topologies support different input voltages, output voltages, power ratings, efficiency ratings, and/or other parameters. Example modes of operation for a switching converter include a continuous conduction mode (CCM), a transition mode (TM), and a discontinuous conduction mode (DCM). Efforts to improve switching converter performance (e.g., smooth transitions between modes and efficiency), robustness (e.g., support for a range of input voltages and/or output voltages), and power density (e.g., W/in$^3$) are ongoing.

SUMMARY

In one example embodiment, a programmable switching converter controller for a power stage with a switch, an inductor, and a diode comprises a pulse-width modulator. The pulse-width modulator is configured to: generate an on-time interval (Ton) that is fixed or proportional to a demand signal proportional to a load adapted to be coupled to an output of the power stage; generate an off-time interval (Toff) that is inversely proportional to the product of a voltage across the inductor while the switch is off and a demand signal proportional to the load; initiate Ton when Toff elapses; and initiate Ton responsive to an external trigger signal.

In one example embodiment, a programmable switching converter controller comprises: a controller output adapted to be coupled to a switch of a power stage; and a control loop with a first loop input, a second loop input and a loop output, the first loop input adapted to be coupled to a sense output of a power stage, the second loop input adapted to be coupled to an output voltage terminal of the power stage, and the loop output coupled to the controller output. The control loop includes an on-time controller having an on-time controller input and an on-time controller output, the on-time controller output is coupled to the loop output. The control loop also includes an off-time controller having: an off-time controller output coupled to the on-time controller input; and an inductor current synthesizer. The inductor current synthesizer includes a first synthesizer input, a second synthesizer input and a synthesizer output, the first synthesizer input coupled to the first loop input, the inductor current synthesizer configured to generate an inductor current estimate at the synthesizer output responsive to a sense value obtained from the sense output, the inductor current estimate related to an inductor of the power stage. The off-time controller also includes a slope controller with a slope controller input and a slope controller output, the slope controller input adapted to receive a demand signal, and the slope controller output coupled to the second synthesizer input and configured to provide a control signal that controls a slope of the inductor current estimate. In another example embodiment, a system comprises a switching converter controller having: a first controller input, the first controller input adapted to be coupled to a sense output of a power stage; a second controller input, the second controller input adapted to be coupled to an output of the power stage; and a controller output, the controller output adapted to be coupled to a control terminal of a switch of the power stage. The switching converter controller also includes a control loop with a first loop input, a second loop input and a loop output, the first loop input adapted to be coupled to a sense output of the power stage, the second loop input adapted to be coupled to an output voltage terminal of the power stage, and the loop output coupled to the controller output. The control loop includes: a latch with a latch input and a latch output, the latch output coupled to the loop output; and an off-time controller. The off-time controller is configured to: generate an inductor current estimate; control a slope of the inductor current estimate responsive to a demand signal; compare the inductor current estimate with a threshold; and assert an ON control signal to the latch input if the inductor current estimate is equal to or less than the threshold.

In yet another embodiment, a system comprises: a programmable switching converter controller having a first controller input, the first controller input adapted to be coupled to a sense output of a power stage. The programmable switching converter controller also has a second controller input, the second controller input adapted to be coupled to an output voltage terminal of the power stage. The programmable switching converter controller further has a controller output, the controller output adapted to be coupled to a control terminal of a switch of the power stage. The programmable switching converter controller also has a control loop adapted to be coupled to: the controller output; the first controller input, and the second controller input. The control loop includes an off-time controller configured to: generate an inductor current estimate; control a slope of the inductor current estimate responsive to a demand signal; compare the inductor current estimate with a threshold; and assert an on-time initiation signal if the inductor current estimate is equal to or less than the threshold.

BRIEF DESCRIPTION OF THE DRAWINGS

FIG. 6 is a graph showing currents during continuous conduction mode (CCM) operations of a switching converter in accordance with an example embodiment.

FIG. 8 is a graph showing currents during TM operations of a switching converter in accordance with another example embodiment.

FIG. 9 is a graph showing currents during discontinuous conduction mode (DCM) operations of a switching converter in accordance with an example embodiment.

FIG. 10 is a graph showing additional details of currents during DCM operations of a switching converter in accordance with an example embodiment.

The same reference numbers (or other reference designators) are used in the drawings to designate the same or similar (structurally and/or functionally) features.

DETAILED DESCRIPTION

Figure 1:
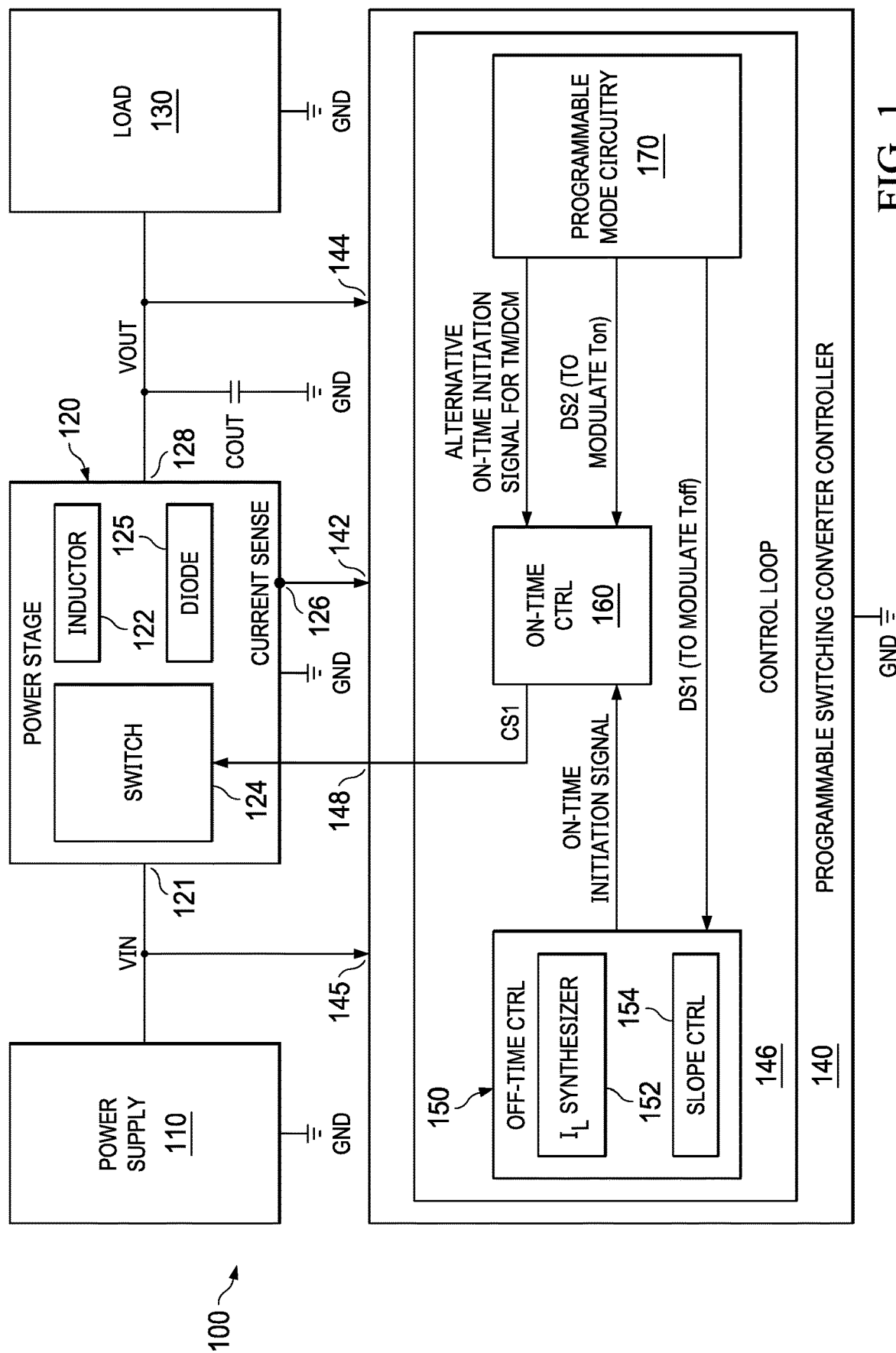
FIG. 1 is a block diagram of an electrical system with a switching converter in accordance with an example embodiment.

Some example embodiments include a programmable switching converter controller (sometimes referred to herein as a programmable pulse-width modulation (PWM) controller) for a power stage (sometimes referred to herein as a PWM converter) with at least one switch, an inductor, and a diode. In different example embodiments, the topology of the power stage may vary (e.g., a boost converter topology, a buck converter topology, a buck-boost converter topology, a flyback converter topology, etc.). The programmable switching converter controller is configured to strategically control the on-time interval (Ton), the off-time interval (Toff), and on-time initiation timing of the at least one switch of the power stage to efficiently provide power to a variable load. In order to optimize efficiency, the switching converter controller supports different modes of operation, including a continuous conduction mode (CCM), a transition mode (TM), and a discontinuous conduction mode (DCM). As used herein, CCM refers to a mode in which the at least one switch is operated in a manner that maintains current in the inductor continuously (e.g., the current levels repeatedly ramp up and ramp down over time) above a zero current level. As used herein, TM refers to a mode in which the at least one switch is operated in a manner that maintains current in the inductor (e.g., the current levels repeatedly ramp up and down over time) while allowing the current in the inductor to reach a zero current level. When the zero current level in the inductor is reached, TM operations provide an immediate response (to toggle the state of the at least one switch and thus ramp up the amount of current in the inductor). As used herein, DCM refers to a mode in which the at least one switch is operated in a manner that sometimes maintains current in the inductor (e.g., the current level ramps up then ramps down) while allowing the current in the inductor to reach a zero current level. When the zero current level in the inductor is reached, DCM operations do not provide an immediate response and allows the current in the inductor to stay at the zero current level for some time (either a fixed or a variable amount of time) before the at least one switch is toggled.

In some example embodiments, the programmable switching converter controller includes a control loop with programmable mode circuitry configured to provide a first control signal (sometimes labeled "DS1" herein) to modulate Toff of a switch of the power stage. Once Toff is complete, an on-time initiation signal is provided to turn on the switch. The programmable switching converter controller also provides a second control signal (sometimes labeled "DS2" herein) to modulate the Ton of the switch (the amount of time the switch stays on). The programmable switching converter controller also provides a third control signal, which is an alternative on-time initiation signal to turn on the switch for TM and DCM operations.

In some example embodiments, the first control signal and second control signal are based on the output of an error amplifier, which compares the output voltage (VOUT) of the power stage with a reference voltage (VREF). In one example embodiment, the first control signal is the output of the error amplifier. The first control signal may be used to control the slope (or discharge rate) of an inductor current estimate (e.g., Vsynth herein) related to the inductor of the power stage. When the inductor current estimate reaches a threshold, the Toff is complete and the programmable switching converter controller provides an on-time initiation signal to turn on the switch. By controlling the slope of the inductor current estimate, the timing of the on-time initiation signal can be provided before, at the same time as, or after the current in the inductor goes to zero.

In some example embodiments, the second control signal is a limited or clamped version of the output of the error amplifier. The second control signal may be limited between a first threshold, V(Ton_min), related to a minimum on-time interval, and a second threshold, V(Ton_max), related to maximum on-time interval. With the second control signal and related limits, the programmable mode circuitry supports a range of Ton suitable for CCM.

Figure 2:
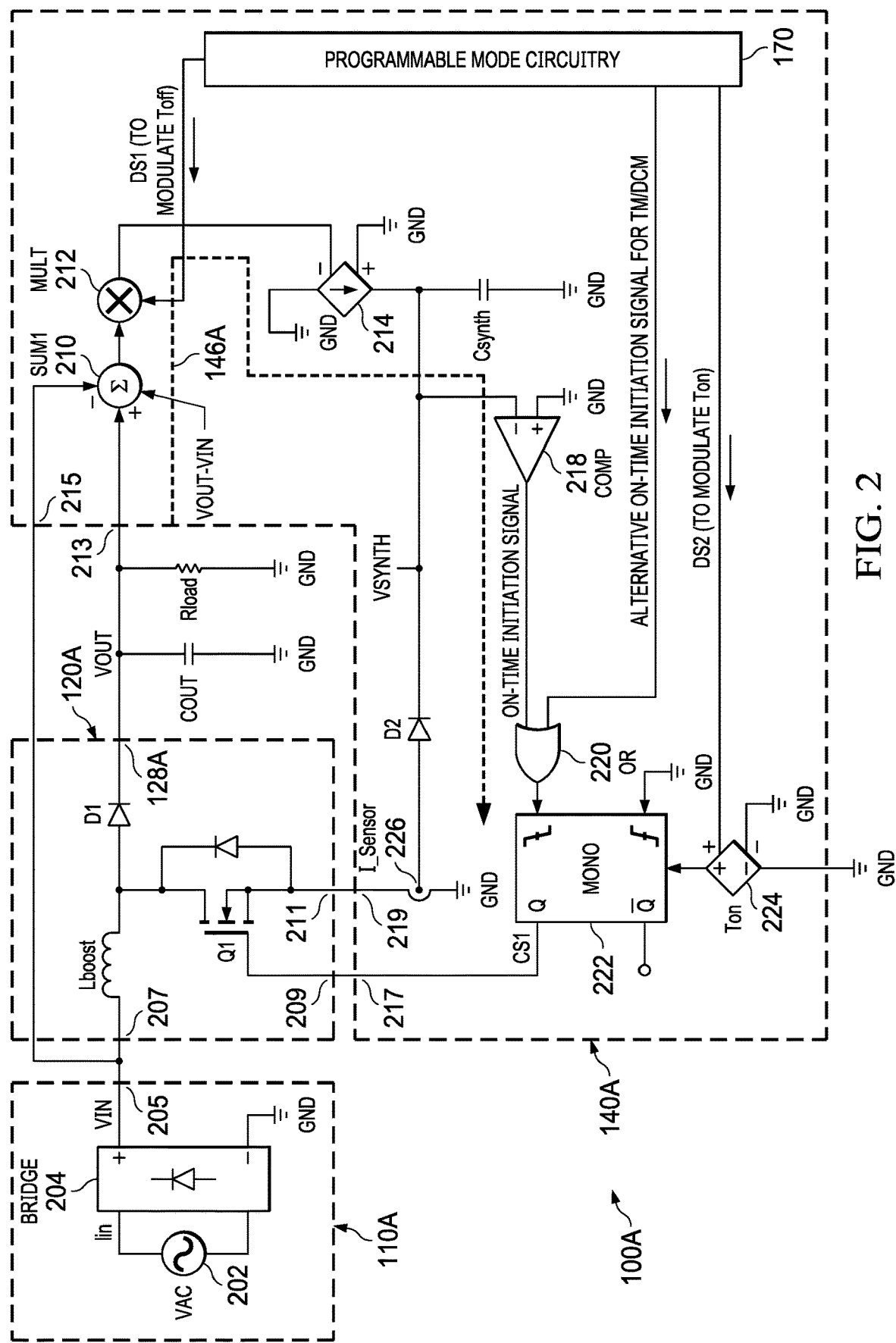
FIG. 2 is a diagram of an electrical system with a switching converter in accordance with another example embodiment.

If Ton is fixed to a certain value, the input current of the switching converter will be proportional to VIN (i.e. the converter will appear to the VIN source as a resistor), consequently providing power factor correction (e.g., a boost converter as in FIG. 2). If Ton is set by turning the switch off when the switch (inductor) current reaches a certain value, the input current of the converter will become substantially independent of the VIN and VOUT, and the output of the converter will behave as a constant current source. This characteristic greatly simplifies the compensation of the VOUT control loop. With the programmable switching converter controller, the output/input characteristics of the converter may be tailored to achieve other desired characteristics by choosing appropriate criteria for determining Ton.

In some example embodiments, the third control signal is based on a zero crossing detection (ZCD) signal or other trigger. With the third control signal, the programmable mode circuitry supports an alternative on-time initiation signal (separate from the on-time initiation signal provided by modulating Toff) suitable for TM and DCM operations. In some example embodiments, programmable parameters, such as V(Ton_min), V(Ton_max), and the timing of the alternative on-time initiation signal are selected to optimize switching converter efficiency and ensure smooth transitions between CCM, TM, and DCM for a given VOUT, VIN, and/or other design considerations (e.g., components, topology, etc.). In some example embodiments, the programmable switching converter controller is used with a power factor correction (PFC) circuit having a bridge. In other example embodiments, the programmable switching converter controller is used with a bridgeless PFC circuit.

The programmable switching converter controller is compatible with different power stage topologies, such as a buck converter topology, a buck-boost converter topology, a flyback converter topology, or a boost converter topology. For buck converter, buck-boost converter, and flyback converter topologies, the programmable switching converter controller may use VOUT to modulate Toff. For boost converter topologies, the programmable switching converter controller may receive VOUT-VIN to modulate Toff.

FIG. 1 is a block diagram of a system 100 in accordance with an example embodiment. As shown, the system 100 includes a power supply 110 configured to provide VIN to a VIN input 121 of the power stage 120 as well as a second input 145 of a programmable switching converter controller 140. In the example of FIG. 1, the power stage 120 includes an inductor 122, a switch 124, and a diode 125. In FIG. 1, the connection between the inductor 122, the switch 124, and the diode 125 may vary depending on the topology of the power stage 120. Example topologies include a buck converter topology, a boost converter topology, a buck-boost converter topology, and a flyback converter topology. Regardless of the topology of the power stage 120, the switch 124 is configured to receive a control signal (CS1) from a controller output 148 of the programmable switching converter controller 140. The power stage 120 may also include a current sense output 126 coupled to a first controller input 142 of the switching converter controller 140. The current sense output 126 is configured to provide the current through the switch 124 (to estimate the inductor current). In operation, the programmable switching converter controller 140 updates the state of CS1 for the switch 124 to regulate VOUT at an output 128 of the power stage 120 based on VIN and the demand of a load 130 coupled to the output 128. As shown, an output capacitor (COUT) is between the output 128 and the load 130 to store charge at the output 128. More specifically, a first side of COUT is coupled to the output 128, and a second side of COUT is coupled to ground (GND). As shown, VOUT is also provided to a third input 144 of the programmable switching converter controller 140.

In the example of FIG. 1, the power supply 110, the power stage 120, the load 130, and the programmable switching converter controller 140 also have a connection to GND. Over time, the programmable switching converter controller 140 may switch between CCM operations, TM operations, and DCM operations as needed to regulate VOUT based on VIN and the demand of the load 130. Without limitation, the load 130 may be a gaming adapter, a television, or telecom equipment with a power rating of a few hundreds of Watts (e.g., 300 W) up to a few thousands of Watts (e.g., 2 kW).

To optimize switching converter efficiency using CCM, TM, and DCM, and to ensure smooth transitions between these modes, the programmable switching converter controller 140 includes a control loop 146 with programmable mode circuitry 170. The programmable mode circuitry 170 is configured to provide a first control signal (DS1) to modulate Toff. Once the Toff duration is complete, an on-time initiation signal is provided to turn on the switch 124. The programmable mode circuitry 170 is also configured to provide: a second control signal (DS2) to modulate Ton; and a third control signal. The third control signal is an alternative on-time initiation signal to turn on the switch 124 for TM and DCM.

As shown, the programmable switching converter controller 140 also includes an off-time controller 150 coupled to the programmable mode circuitry 170. The off-time controller is configured to receive DS1 and provide an on-time initiation signal after an adjustable delay based on DS1. The programmable switching converter controller 140 also includes an on-time controller 160 coupled to the programmable mode circuitry 170 and the off-time controller 150. The on-time controller 160 is configured to assert CS1 based responsive to the on-time initiation signal from the off-time controller 150, or responsive to the alternative on-time initiation signal from the programmable mode circuitry 170. The duration of the on-time is controlled by the on-time controller 160 based on DS1.

In some example embodiments, the off-time controller 150 is configured to: provide an inductor current estimate related to the inductor 122 of the power stage 120; control a slope (rate of discharge) of the inductor current estimate based on a demand signal (e.g., DS1 in FIG. 1); compare the inductor current estimate to a threshold (e.g., GND in FIG. 2); and generate the on-time initiation signal (e.g., the output of comparator 218 in FIG. 2) to turn on the switch 124 if the inductor current estimate is equal to or less than the threshold. In some example embodiments, the inductor current estimate is based in part on sensing the current through the switch 124 when it is active. Controlling the slope of the inductor current estimate may be based DS1 as well as VOUT or VIN-VOUT.

In the example of FIG. 1, the off-time controller 150 of the control loop 146 includes an inductor current ($I_L$) synthesizer 152 configured to provide an inductor current estimate for the inductor 122. In some example embodiments, the $I_L$ synthesizer 152 uses: a current sensor (e.g., the current sensor 226 in FIG. 2) to sense current through the switch 124; and a capacitor (e.g., Csynth in FIG. 2) to store charge from the current sensor.

In some example embodiments, the slope controller 154 is configured to control a slope (rate of discharge) of the inductor current estimate provided by the $I_L$ synthesizer 152. In some example embodiments, the slope controller 154 multiplies the difference between VIN and VOUT by DS1 (e.g., in a boost converter scenario). In other example embodiments, the slope controller 154 multiplies the VOUT by DS1 (e.g., a buck converter, buck-boost converter, or flyback converter scenario). The result of the multiplication is provided as an input to a voltage-to-current converter (e.g., the voltage-to-current converter 214 in FIG. 2) coupled to a capacitor (e.g., Csynth in FIG. 2) of the $I_L$ synthesizer. In this example, the voltage-to-current converter operates to control the slope of the inductor current estimate based on the multiplication result, DS1*(VIN-VOUT) or DS1*VOUT. Thus, in some example embodiments, the slope (rate of discharge) of the inductor current estimate varies as a function of DS1 as well as VIN-VOUT or VOUT.

In the example of FIG. 1, the on-time controller 160 is configured to modulate Ton responsive to DS2 received from the programmable mode circuitry 170. The on-time controller 160 is also configured to assert CS1 for Ton responsive to the on-time initiation signal provided by the off-time controller 150 and/or responsive to the alternative on-time initiation signal provided by the programmable mode circuitry 170. With DS2, Ton is adjustable. The timing of asserting CS1 may based on the on-time initiation signal from the off-time controller 150 (e.g., to support CCM operations), and/or the alternative on-time initiation signal from the programmable mode circuitry 170 (e.g., to support TM/DCM operations).

With the off-time controller 150, the control loop 140 is configured to control the slope of an inductor current estimate in a manner that supports different VIN and/or VOUT combinations, and different power stage topologies/components. The off-time controller 150 may additionally or alternatively control the slope of the inductor current estimate to enable smooth transitions between switching converter modes of operations, such as CCM, TM, and DCM.

FIG. 2 is a diagram of a system 200 in accordance with another example embodiment. As shown, the system 200 includes a power supply 110A (an example of the power supply 110 in FIG. 1). In some example embodiments, the power supply 110A includes an alternating current (AC) source 202 coupled to a bridge circuit 204. The output 205 of the power supply 110A provides a rectified direct-current (DC) voltage for use as the VIN for a power stage 120A (an example of the power stage 120 in FIG. 1).

As shown, the output 205 of the power supply 110A is coupled to a VIN input 207 of the power stage 120A. In the example of FIG. 2, the power stage 120A has a boost converter topology with an inductor Lboost (an example of the inductor 122 in FIG. 1), a diode D1 (an example of the diode in FIG. 1), and a power transistor Q1 (an example of the switch 124 in FIG. 1). More specifically, a first side of Lboost is coupled to the VIN input 207, and a second side of Lboost is coupled to an anode of D1. The cathode of D1 is coupled to an output 128A (an example of the output 128 in FIG. 1) of the power stage 120A. The second side of Lboost is also coupled to a first current terminal of Q1. The second current terminal of Q1 is coupled to GND, and the control terminal of Q1 is coupled to a control input 209 of the power stage 120A.

In the example of FIG. 2, Q1 is an n-channel metal oxide semiconductor field-effect transistor (nMOS transistor) controlled by a control signal (e.g., CS1) provided by a programmable switching converter controller 140A (an example of the programmable switching converter controller 140 in FIG. 1) to regulate VOUT based on VIN and the demand of a load (Rload). As shown, the output 128A (an example of the output 128 in FIG. 1) of the power stage 120A is coupled to an output capacitor (COUT) and Rload. More specifically, a first side of COUT and a first side of Rload are coupled to the output 128A. The second sides of COUT and Rload are coupled to GND. Without limitation, Rload may be a gaming adapter, a television, or telecom equipment with a power rating of a few hundreds of Watts (e.g., 300 W) up to a few thousands of Watts (e.g., 2 kW).

As shown, the programmable switching converter controller 140A includes a first input 219 (an example of the first input 142 in FIG. 1), a second input 215 (an example of the second input 145 in FIG. 1), a third input 213 (an example of the third input 144 in FIG. 1), and a controller output 217. The first input 219 is coupled to a current sense output 211 of the power stage 120A to sense a current through Q2 when active. The second input 215 is coupled to the VIN input 207. The third input 213 is coupled to the output 128A of the power stage 120A. The controller output 217 of the programmable switching converter controller 140A is coupled to the control input 209 of the power stage 120A.

In some example embodiments, the programmable switching converter controller 140A includes a control loop 146A (an example of the control loop 146 in FIG. 1) with Toff modulation and Ton modulation, which is controlled by the programmable mode circuitry 170. As described in FIG. 1, the programmable mode circuitry 170 is configured to provide: DS1 to modulate Toff; DS2 to modulate Ton. The programmable mode circuitry 170 also provides the alternative on-time initiation signal to turn on Q1 for TM and DCM.

In the example of FIG. 2, Toff modulation for control loop 146A is performed using a subtract circuit 210, a multiplier 212, and a voltage-to-current converter 214. More specifically, the subtract circuit 210 has: a first subtract circuit input coupled to the third input 213 to receive VOUT; and a second subtract circuit input coupled to the second input 215 to receive VIN. The subtract circuit 210 also includes a subtract circuit output configured to provide VIN−VOUT. The value of VIN−VOUT is provided to a first input of the multiplier circuit 212, which multiplies VIN−VOUT by DS1 (provided to a second input of the multiplier circuit 212). The output of the multiplier circuit 212 is provided to a control input (the "−" input in FIG. 2) of the voltage-to-current converter 214. The current terminal of the voltage-to-current converter 214 is coupled to a first side of Csynth. In operation, the voltage-to-current converter 214, controlled by the output of the multiplier circuit 212, determines how slowly charge (the inductor current estimate) at Csynth discharges over time. In the example of FIG. 2, the subtract circuit 210, the multiplier circuit 212, and the voltage-to-current converter 214 are components of a slope controller (e.g., the slope controller 154 of FIG. 1).

In the example of FIG. 2, charge is added to Csynth from a current sensor 226 coupled to a current sense output 211 of the power stage 120A via the first input 219 of the programmable switching converter controller 140A. The current sensor 226 is configured to monitor the current flowing through Q1 to GND (when Q1 in on). In some example embodiments, the current sensor 226 provide a sense voltage that passes through a diode D2 to add charge to Csynth. The charge on Csynth is used as an inductor current estimate (Vsynth) related to Lboost. In the example of FIG. 2, the current sensor 226, D2, and Csynth are components of an $I_L$ synthesizer (e.g., the $I_L$ synthesizer 152 in FIG. 1).

In the example of FIG. 2, the inductor current estimate is provided to an inverting ("−") input of a comparator 218, while the non-inverting ("+") input of the comparator 218 is coupled to GND. The comparator 218 is configured to compare the inductor current estimate with a threshold (e.g., GND). If the inductor current estimate is equal to or less than the threshold, the comparator 218 asserts the on-time initiation signal (ending the off-time) to turn on Q1. The delay of the on-time initiation signal is the modulated Toff, which is adjustable based on DS1, VIN, and VOUT in FIG. 2. The output of the comparator 218 is coupled to a first input of an OR gate 220. As shown, the second input of the OR gate 220 receives the alternative on-time initiation signal from the programmable mode circuitry 170. The alternative on-time initiation signal is used to turn on Q1 for TM and DCM. In the example of FIG. 2, the output of the OR gate is provided to a first input of a monostable 222. In the example of FIG. 2, the OR gate 220, the monostable 222, and a voltage-to-current converter 224 are components of an on-time controller (e.g., the on-time controller 160 in FIG. 1).

As shown, the monostable 222 also includes a second input coupled to the voltage-to-current converter 224. The voltage-to-current converter 224 is configured to assert a signal to the second input of the monostable 222 responsive to DS2. With the topology of FIG. 2, when the OR gate output is high (e.g., a logical "1"), the monostable 222 causes CS1 to be high (a logical "1"). The on-time duration (the amount of time for which CS1 remains asserted) is based on DS2.

In another example embodiment, an on-time controller (e.g., the on-time controller 160 in FIG. 1) includes: a first comparator; a second comparator; and an SR latch. The first comparator is configured to detect zero crossing of the voltage on Csynth, where the output of the first comparator sets the SR latch. The second comparator is configured to reset the SR latch when a current sense value (e.g., indicating the amount of current through the switch) exceeds the value of DS2, thereby modulating Ton for Q1.

With the example of FIG. 2, during the conduction of Q1, the current sensor 226 (e.g., a shunt or current transformer) charges Csynth to a voltage that is proportional to the current in Lboost. The voltage-to-current converter 214 discharges Csynth at a rate proportional to the product of (VOUT−VIN) and DS1. When the voltage on Csynth (sometimes referred to as "Vsynth") reaches zero, the comparator 218 triggers the one-shot monostable 222, which turns Q1 on for the duration of Ton. The Ton duration may be fixed or adjustable based on DS2, VIN, and/or VOUT. Depending on the value of DS1, Vsynth may decrease at a higher rate, a lower rate, or an equal rate compared to the rate at which the inductor current of Lboost decreases over time.

If Vsynth decreases at a rate equal to the decrease in the inductor current over time, Q1 will be turned on when the current in Lboost reaches zero, and the switching converter (i.e., the power stage 120A directed by the programmable switching converter controller 140A) operates in TM. If Vsynth decreases at a rate higher than the decrease in the inductor current over time, Q1 will be turned on before the current in Lboost reaches zero, and the switching converter operates in CCM. If Vsynth decreases at a rate lower than the inductor current, Q1 will be turned on after the current in Lboost reaches zero, and the switching converter operates in DCM.

Figure 3:
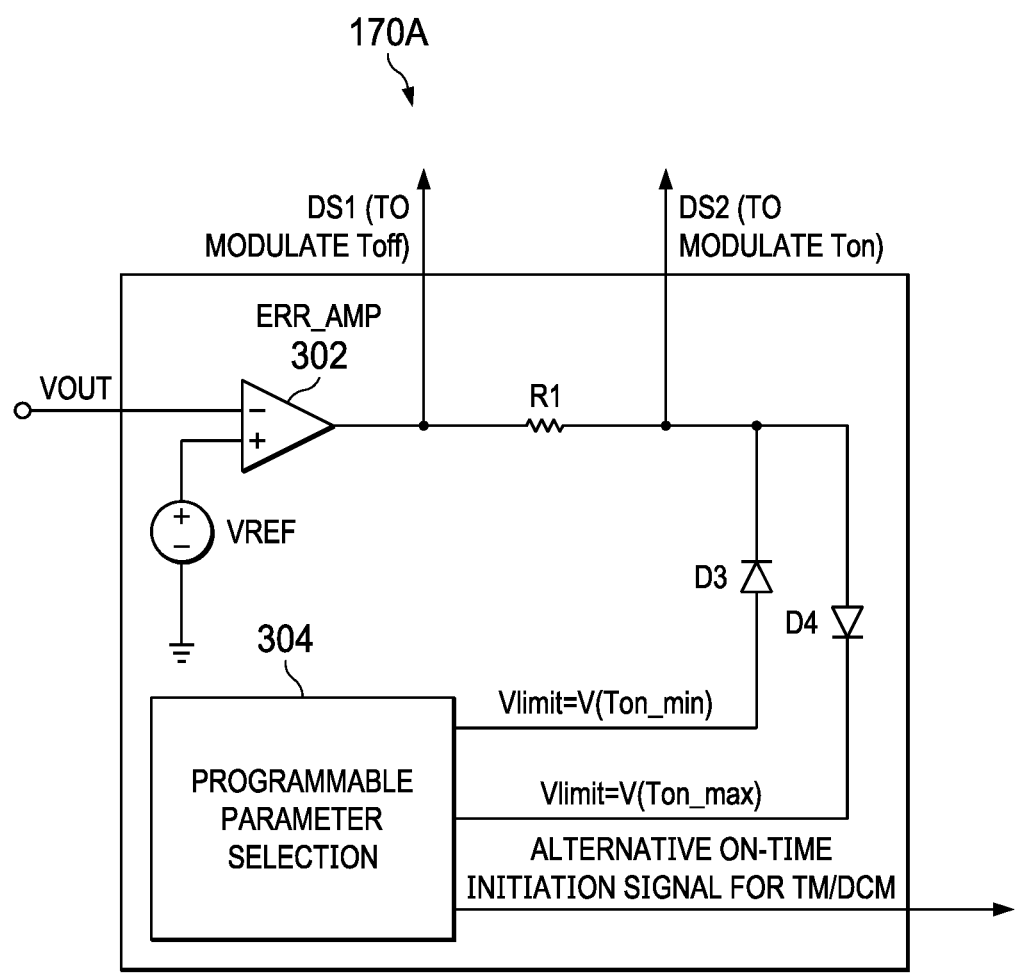
FIG. 3 is a diagram of programmable mode circuitry for a programmable switching converter controller in accordance with an example embodiment.

FIG. 3 is a diagram of programmable mode circuitry 170A (an example of the programmable mode circuitry 170 of FIGS. 1 and 2). As shown, the programmable mode circuit 170A includes an error amplifier 302 with an inverting ("−") input coupled to VOUT and a non-inverting ("+") input coupled to VREF. The output of the error amplifier 302 indicates the difference between VOUT and VREF, and is used as DS1. As shown, the programmable mode circuitry 170A also includes a resistor (R1) coupled to the output of the error amplifier 302. More specifically, the first side of R1 is coupled to the output of the error amplifier 302, and the second side of R1 is coupled to limiting or clamping circuitry, which limits the voltage at the second side of R1 to a range between V(Ton_min) and V(Ton_max). In some example embodiments, the limiting or clamping circuitry includes diodes D3 and D4. Specifically, the cathode of D3 is coupled to the output of the error amplifier 302, while the anode of D3 is coupled to a programmable mode parameter selection block 304 of the programmable mode circuitry 170A, which selects V(Ton_min) to limit DS2 to a value greater than V(Ton_min). Also, the anode of D4 is coupled to the output of the error amplifier 302, while the cathode of D4 is coupled to a programmable mode parameter selection block 304, which selects V(Ton_max) to limit DS2 to a value less than V(Ton_max).

In the example of FIG. 3, the programmable parameter selection block 304 provides V(Ton_min), V(Ton_max), as well as the alternative on-time initiation signal for TM/DCM control. In some example embodiments, the programmable parameter selection block 304 includes circuitry to receive and store parameters from a software user interface (e.g., a user or designer is able to select the parameters). In other example embodiments, the programmable parameter selection block 304 includes circuitry configured to: perform tests or measurements; and select the programmable parameters based on test/measurement results.

Figure 4:
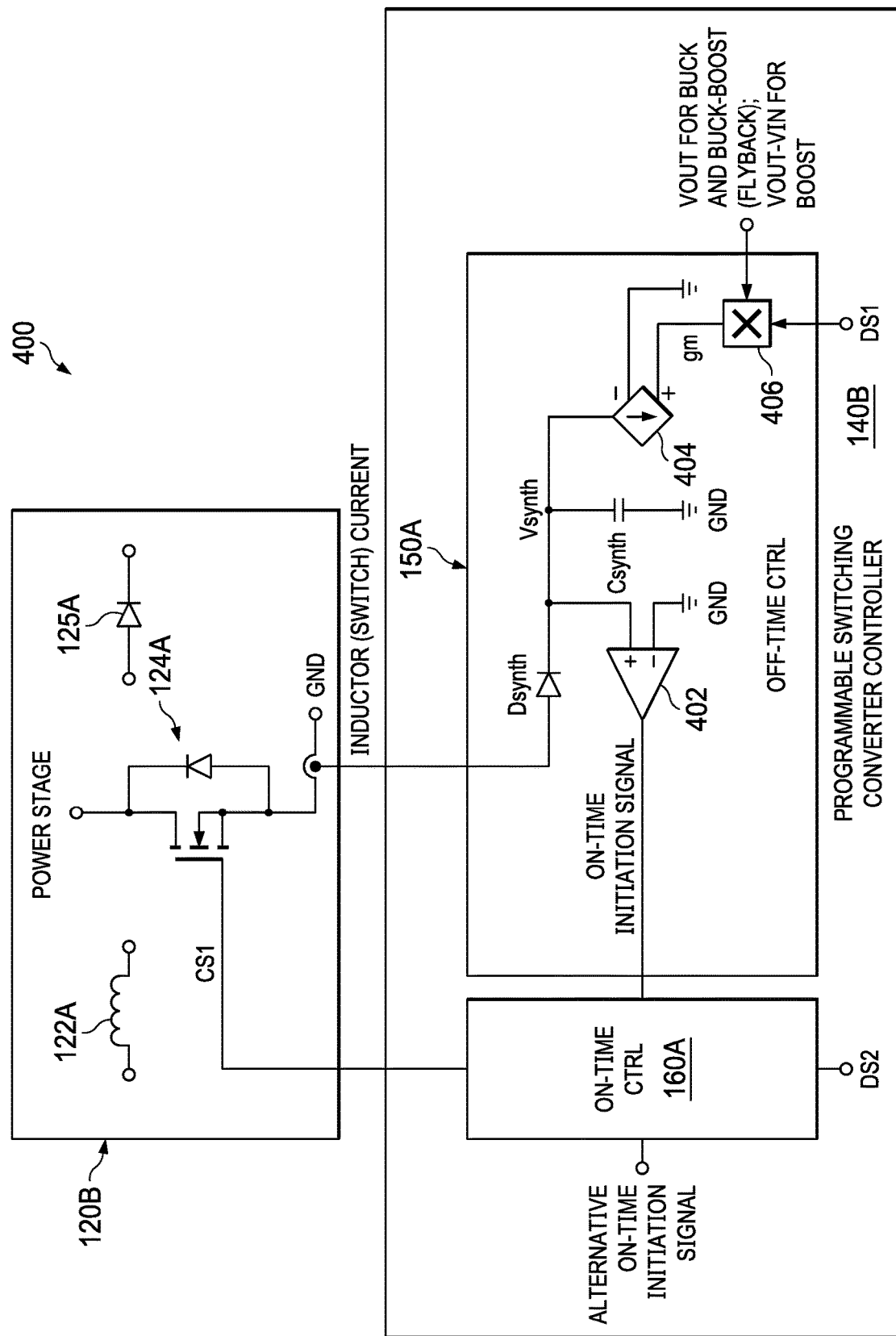
FIG. 4 is a diagram of an switching converter in accordance with an example embodiment.

FIG. 4 is a diagram of an switching converter 400 in accordance with an example embodiment. The switching converter 400 includes a power stage 120B (a PWM converter) with an inductor 122A (an example of the inductor 122 in FIG. 1), a switch 124A (an example of the switch 124 in FIG. 1), and a diode 125A (an example of the diode 125 in FIG. 1). In different example embodiments, the power stage 120B may have a buck converter topology, a buck-boost converter topology, a flyback converter topology, or a boost converter topology (e.g., as in FIG. 2). Regardless of the particular power stage topology used, the programmable switching converter controller 140B is configured to provides a control signal (e.g., CS1) to control the on/off state of the switch 124A, where CS1 is a PWM-based signal.

To control CS1, the programmable switching converter controller 140B includes an off-time controller 150A (an example of the off-time controller 150 in FIG. 1) coupled to an on-time controller 160A (an example of the on-time controller 160 in FIG. 1). The off-time controller 150A is configured to obtain an inductor current estimate and control the slope (rate of discharge) of the inductor current estimate.

More specifically, the off-time controller is configured to sense the inductor current or switch current. In the example of FIG. 3, the sensed current is a voltage that passes through a diode (Dsynth) and is stored across Csynth. The voltage across Csynth is used as the inductor current estimate. With the off-time controller 150A, the slope (rate of discharge) of inductor current estimate is adjustable using a voltage-to-current converter 404 (an example of the voltage-to-current converter 214 in FIG. 2) controlled by the output of a multiplier 406. A first input to the multiplier 406 is DS1. A second input to the multiplier 406 varies depending on the topology of the power stage 120B. For buck converter topologies, buck-boost converter topologies, and flyback converter topologies, the second input to the multiplier 406 may be VOUT. For boost converter topology (e.g., as in FIG. 2), the second input to the multiplier 406 may be VIN−VOUT.

As shown, the inductor current estimate is compared with ground by a comparator 402 (an example of the comparator 218 in FIG. 2) to detect when the inductor current estimate crosses zero. In such case, an on-time initialization signal is provided to the on-time controller 160A, where the timing of the on-time initialization signal is based on modulating Toff by controller the slope of the inductor current estimate. As shown, the on-time controller 160A also received an alternative on-time initiation signal, which is used for TM/DCM. The on-time controller 160A also receives DS2, which is used to modulate Ton. In some example embodiments, DS1, DS2, and the alternative on-time initiation signal are provided by programmable mode circuitry (e.g., the programmable mode circuitry 170 in FIGS. 1 and 2, or the programmable mode circuitry 170 in FIG. 3).

In some example embodiments, a switching converter (e.g., the switching converter 400) includes a switch (e.g., the switch 124A, a rectifier (e.g., the diode 125A), and an inductor (e.g., the inductor 122A. The ON and OFF conduction intervals (Ton and Toff) of the switch are controlled by a pulse-width modulator (e.g., the programmable switching converter controller 140B). The pulse-width modulator is configured to: generate a Ton that may be fixed or proportional to a demand signal proportional the converter's load; and generate a Toff that is inversely proportional to the product of the voltage appearing across the inductor while the switch is off and a demand signal proportional the load coupled to an output of the switching converter. In some example embodiments, Ton begins when Toff generated by the PWM elapses or when initiated by an external trigger signal (e.g., the alternative on-time initiation signal).

In some example embodiments, the PWM generates Toff by: charging a capacitor during Ton by a voltage proportional to the current in the inductor; and discharging the capacitor after Ton expires using a current proportional to the product of voltage across the inductor and a demand signal proportional to the loading of the converter. In some example embodiments, Toff is equal to the time interval between the end of Ton and the voltage on the capacitor reaching zero.

Figure 5:
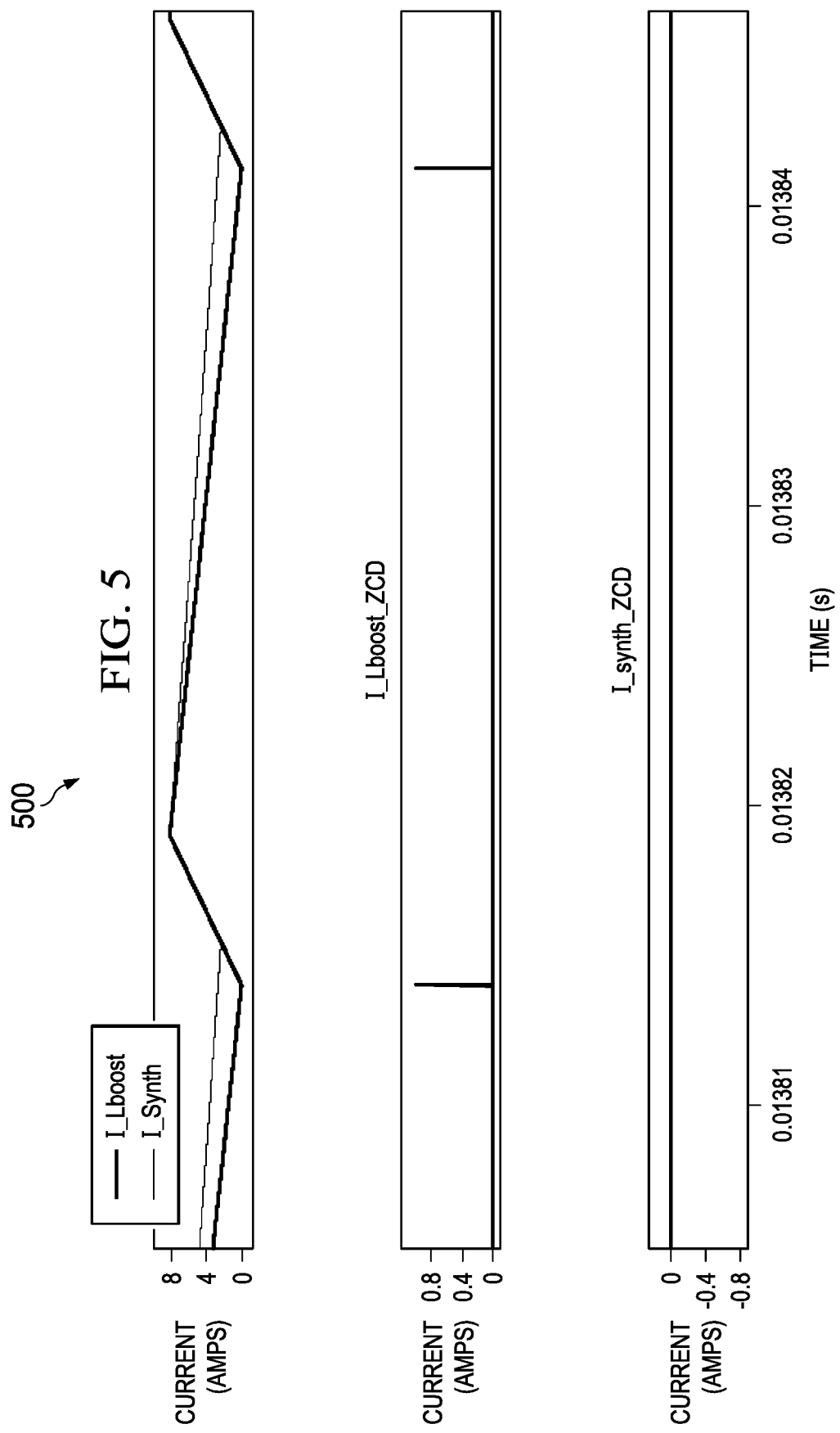
FIG. 5 is a graph showing currents during transition mode (TM) operations of a switching converter in accordance with an example embodiment.

FIG. 5 is a graph 500 showing currents during TM operations of a switching converter as a function of time in accordance with an example embodiment. In graph 500, waveforms for I_Lboost, I_Synth, I_Lboost_ZCD, and I_Synth_ZCD are represented. I_Lboost is the current through Lboost. I_Synth is the inductor current estimate related to Lboost. In some example embodiment, I_Synth represents a current that estimated using a voltage (e.g., Vsynth). I_Lboost_ZCD is a signal that indicates inductor current ZCD occurrences related to I_Lboost. I_Synth_ZCD is a signal that indicates inductor current ZCD occurrences related to I_Synth. As shown, the downward slopes of I_Synth are less steep than the downward slopes of I_Lboost, and the upward slopes of I_Synth and I_Lboost are equal. When I_Lboost reaches zero, I_Lboost_ZCD signals a ZCD event. Since the downward slope of I_Synth is less than the downward slope of I_Lboost, there are no ZCD events for I_Synth as indicated by I_Synth_ZCD.

FIG. 6 is a graph showing currents during CCM operations of a switching converter in accordance with an example embodiment. In graph 600, waveforms for I_Lboost and Iin (the input current into the power stage) are represented. As shown, I_Lboost ranges between about 0 amps to +15 amps over time depending on Iin which ranges from about −15 A to +15 A.

Figure 7:
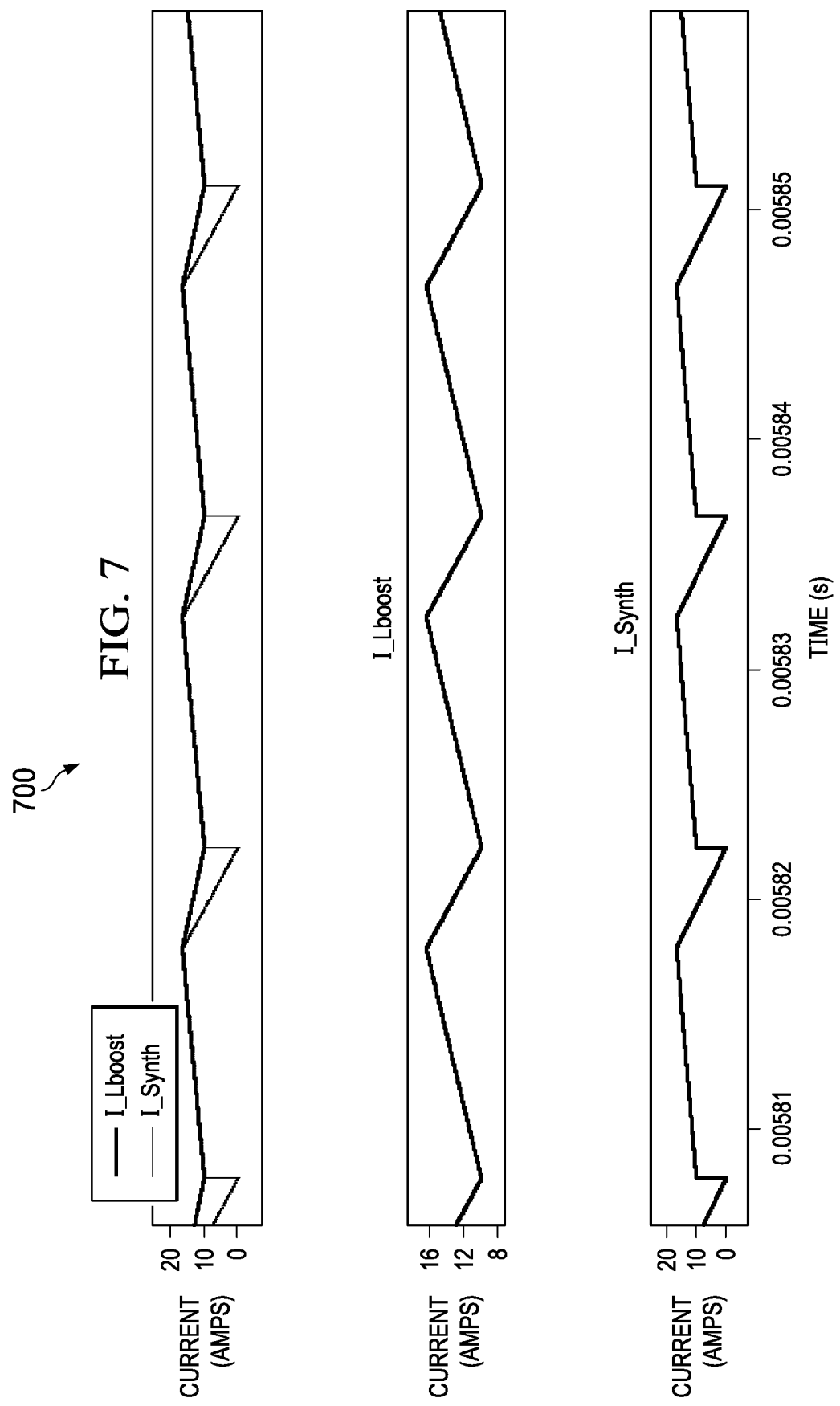
FIG. 7 is a graph showing additional details of currents during CCM operations of a switching converter in accordance with an example embodiment.

FIG. 7 is a graph 700 showing additional details of currents during CCM operations of a switching converter in accordance with an example embodiment. In graph 700, waveforms for I_Lboost and I_Synth are represented together and separately. As shown, I_Lboost ranges from about +8 to +16 amps over time, and does not reach 0. On the other hand, I_Synth ranges between about 0 to +16 amps. As shown, I_Synth and I_Lboost have the same upward slopes. Also, I_Synth has steeper downward slopes than I_Lboost, which allows I_Synth to reach zero.

FIG. 8 is a graph 800 showing currents during TM operations of a switching converter in accordance with another example embodiment. In graph 800, waveforms for I_Lboost and Iin are represented. As shown, I_Lboost ranges between about 0 amps to +8 amps over time depending on Iin, which ranges from about −4 A to +4 A.

FIG. 9 is a graph 900 showing currents during DCM operations of a switching converter in accordance with an example embodiment. In graph 900, waveforms for I_Lboost and Iin are represented. As shown, I_Lboost ranges between about 0 amps to +7 amps over time depending on Iin, which ranges from about −1 A to +1 A. In graph 900, some distortion to Iin occurs, but the shape is still generally sinusoidal.

FIG. 10 is a graph 1000 showing additional details of currents during DCM operations of a switching converter in accordance with an example embodiment. In graph 1000, waveforms for I_Lboost and I_Synth are represented together. I_Lboost is also shown separately. As shown, the downward slope of I_Synth is less steep that the downward slope of I_Lboost. By controlling the downward slope of I_Synth, the off-time duration of a power stage switch is adjustable for DCM operations.

Figure 11:
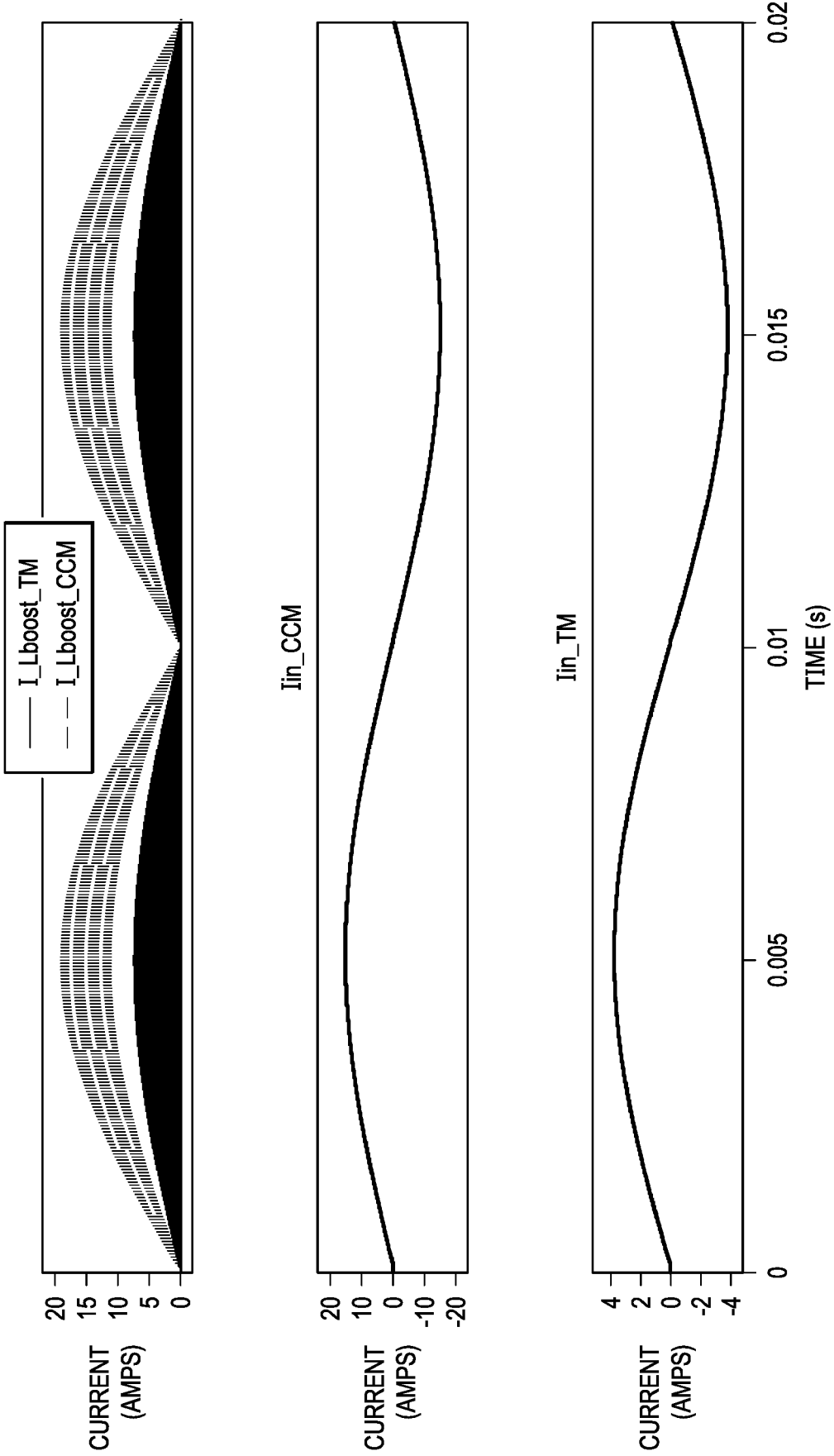
FIG. 11 is a graph comparing currents of steady state TM and CCM operations of a switching converter in accordance with an example embodiment.

FIG. 11 is a graph 1100 comparing currents of steady state TM and CCM operations of a switching converter in accordance with an example embodiment. In graph 1100, waveforms for I_Lboost_TM, I_Lboost_CCM, Iin_CCM, and Iin_TM are represented. I_Lboost_TM is I_Lboost during steady state TM operations. I_Lboost_CCM is I_Lboost during CCM operations. Iin_CCM is the input current from the power supply (e.g., power supply 110 in FIG. 1) during CCM operations. Iin_TM is the input current from the power supply during TM operations. As shown, I_Lboost_CCM ranges from around 0 to +18 amps, and I_Lboost_TM ranges from around 0 to +7 amps. Also, Iin_CCM ranges from about −15 to +15 amps, and Iin_TM ranges from about −4 to +4 amps.

Figure 12:
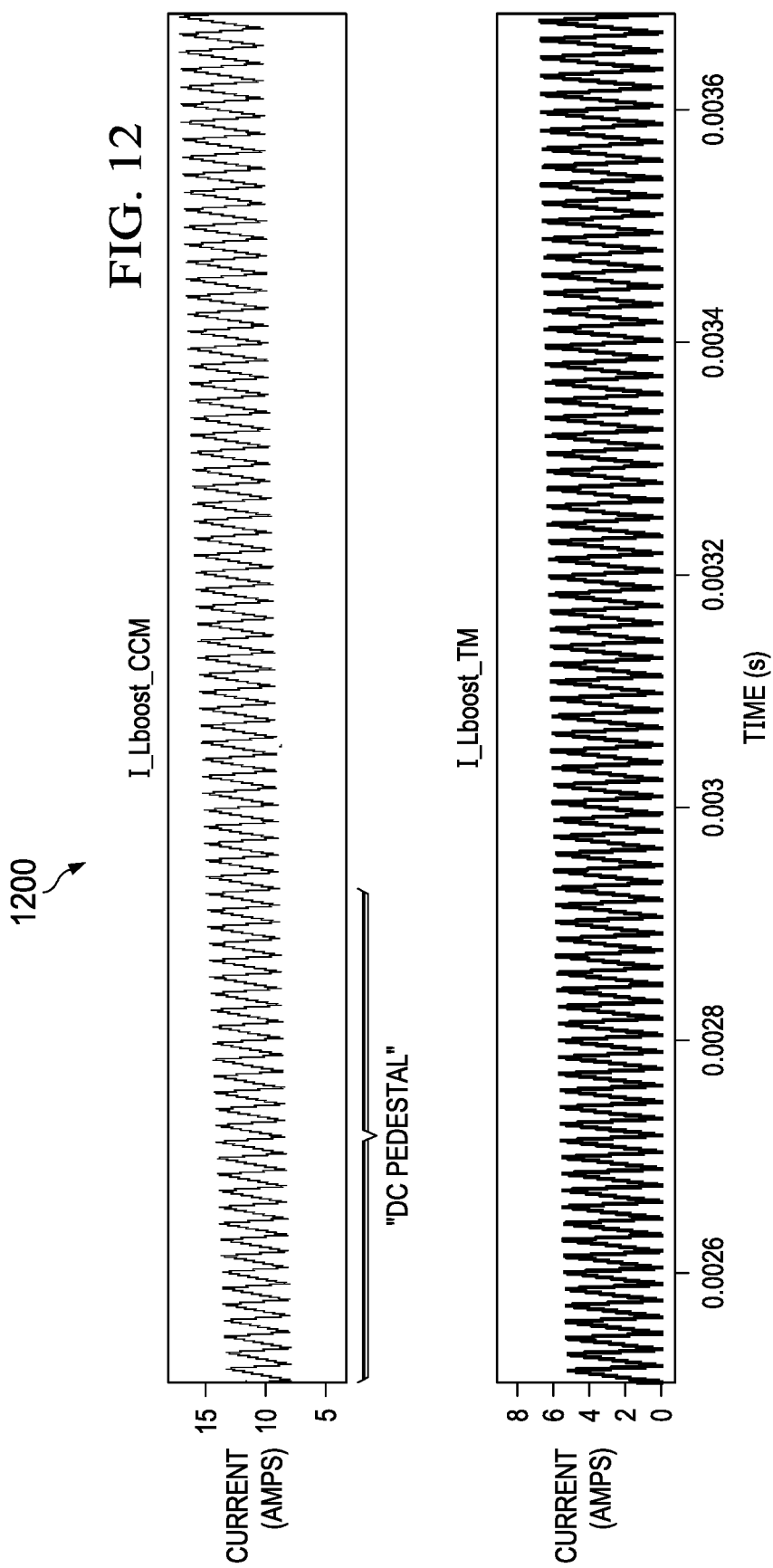
FIG. 12 is a graph comparing additional details of currents of steady state TM and CCM operations of a switching converter in accordance with an example embodiment.

FIG. 12 is a graph 1200 comparing additional details of currents of steady state TM and CCM operations of a switching converter in accordance with an example embodiment. In graph 1200, waveforms for I_Lboost_CCM and I_Lboost_TM are represented. As shown, I_Lboost_CCM ranges from around +8 to +13 amps initially, where +8 amps corresponds to a DC pedestal. Eventually, I_Lboost_CCM ranges from around +10 to +18. Also, I_Lboost_TM ranges from around 0 to +5 amps initially. Eventually, I_Lboost_TM ranges from around 0 to +7 amps.

Figure 13:
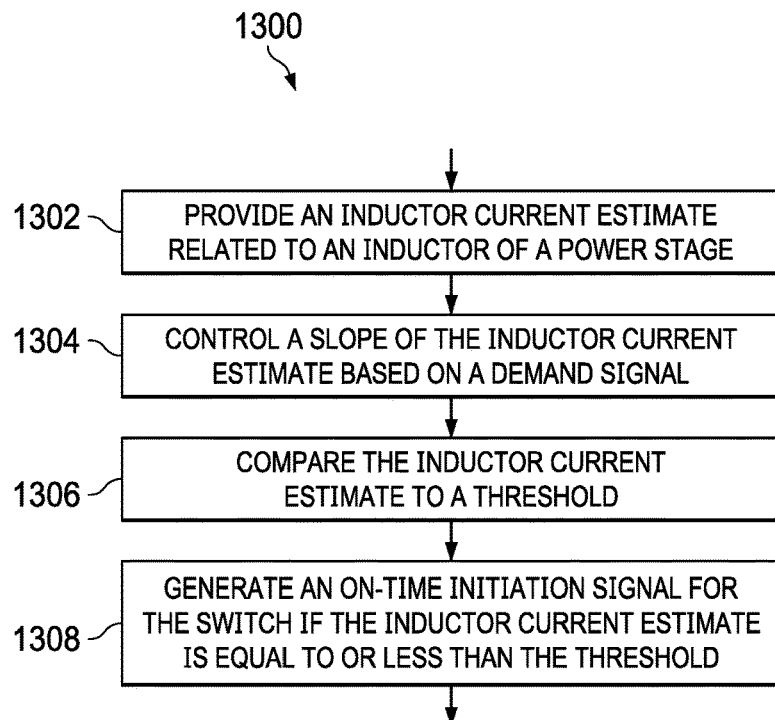
FIG. 13 is a programmable switching converter control method in accordance with an example embodiment.

FIG. 13 is a programmable switching converter control method 1300 in accordance with an example embodiment. The programmable switching converter control method 1300 is performed, for example, by a programmable switching converter controller (e.g., the programmable switching converter controller 140 in FIG. 1, the programmable switching converter controller 140A in FIG. 2, the programmable switching converter controller 140B in FIG. 4) to control a switch (e.g., the switch 124 in FIG. 1, Q1 in FIG. 2, or the switch 124A in FIG. 4) of a power stage (e.g., the power stage 120 in FIG. 1, the power stage 120A in FIG. 2, or the power stage 120B in FIG. 4). As shown, the method 1300 includes providing an inductor current estimate (e.g., Vsynth) related to an inductor (e.g., inductor 122 in FIG. 1, or Lboost in FIGS. 2-4) of the power stage at block 1302. At block 1304, a slope of the inductor current estimate is controlled based on a demand signal (e.g., DS1 in FIGS. 1, 2, and 4). In some example embodiments, controlling the slope of the inductor current estimate at block 1304 is based on a difference between VIN of the power stage and VOUT of the power stage. For example, the slope of the inductor current estimate may be a function of VIN−VOUT multiplied by the demand signal. In another example, the slope of the inductor current estimate may be a function of VOUT multiplied by the demand signal. At block 1306, the inductor current estimate is compared to a threshold. At block 1308, an on-time initiation signal for the switch is generated if the inductor current estimate is equal to or less than the threshold. In some example embodiments, the method 1300 includes providing the inductor current estimate based on a current sense voltage indicating current through the switch (e.g., the switch 124 in FIG. 1, Q1 is FIG. 2, and Q6 in FIG. 4) when active.

Figure 14:
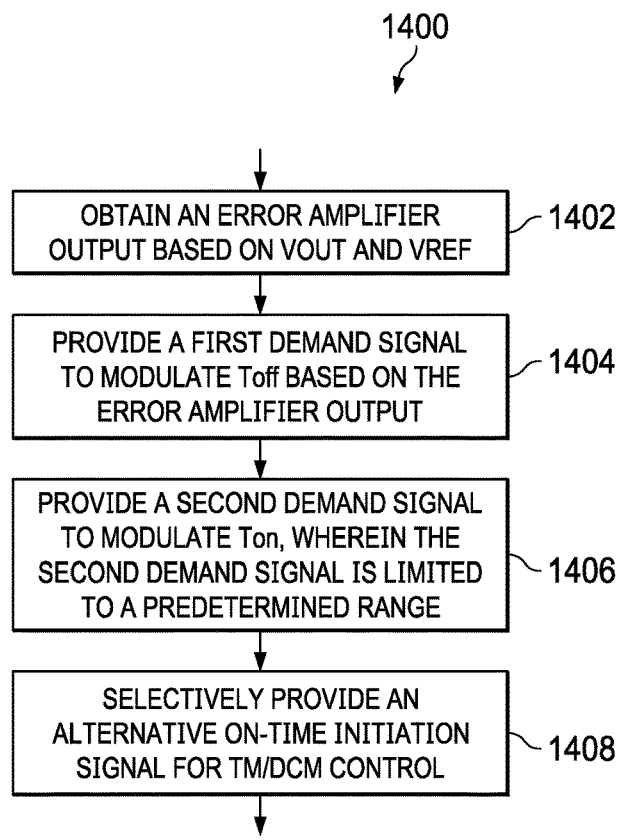
FIG. 14 is another programmable switching converter control method in accordance with an example embodiment.

FIG. 14 is another programmable switching converter control method 1400 in accordance with an example embodiment. The programmable switching converter control method 1400 is performed, for example, by programmable mode circuitry (e.g., the programmable mode circuitry 170 in FIGS. 1 and 2, or the programmable mode circuitry 170A in FIG. 3). As shown, the method 1400 includes obtaining an error amplifier output based on VOUT and VREF at block 1402. At block 1404, a first demand signal is provided to modulate Toff based on the error amplifier output. At block 1406, a second demand signal is provided to modulate Ton, where the second demand signal is limited to a predetermined range (e.g., using V(Ton_min) to V(Ton_max)). At block 1408, an alternative ON control signal is selectively provided for TM/DCM control.

With the method 1400, the first demand signal (e.g., DS1), second demand signal (e.g., DS2), the predetermined range for the second demand signal (e.g., using V(Ton_min) to V(Ton_max)), and the timing of the alternative on-time initiation signal may vary for different power stage topologies, different VIN, different VOUT, different loads, and/or other design parameters. Regardless of the particular switching converter scenario, the programmable switching converter controller is able to optimize efficiency using available inputs (e.g., VOUT, VIN, a current sense value related to the switch when active) and programmable parameter selection. Examples of the programmable parameters include V(Ton_min), V(Ton_max), and the timing of the alternative on-time initiation signal for TM/DCM control. Such programmable parameters may be provided via a software interface and stored for use with the programmable switching converter controller. As another option, programmable parameters may be based on on-chip test or measurement circuitry to determine appropriate values.

In some example embodiments, the programmable switching converter controller is an integrated circuitry (IC) or other circuit that will be coupled to a power stage (another IC or discrete components). A programmable switching converter controller IC may include inputs for VIN, VOUT, a current sense value related to the switch when active, and possibly the programmable parameters (e.g., a communication interface or other interface to receive instructions). The programmable switching converter controller will also include an output to provide a control signal to a switch of the power stage. With the programmable switching converter controller, efficiency and robustness can be achieved regardless of the particular power stage topology using the programmable parameters and mode options described herein. In contrast, conventional switching converter controllers are usually limited to a particular power stage topology, VIN value, and VOUT value, etc.

In some example embodiments, a system (e.g., the system 100 in FIG. 1) includes a programmable switching converter controller (e.g., the programmable switching converter controller 140 in FIG. 1, the programmable switching converter controller 140A in FIG. 2, or the programmable switching converter controller 140B in FIG. 4) having: a first controller input (e.g., the first input 142 in FIG. 1). The first controller input is adapted to be coupled to a current sense output (e.g., the sense output 126 in FIG. 1) of a power stage. The programmable switching converter controller also includes a second controller input (e.g., the third input 144 in FIG. 1). The second controller input is adapted to be coupled to an output (e.g., output 128 in FIG. 1) of the power stage. The programmable switching converter controller further includes a controller output (e.g., controller output 148 in FIG. 1). The controller output is adapted to be coupled to a control terminal of a switch (e.g., the switch 124 in FIG. 1) of the power stage.

In some example embodiments, the programmable switching converter controller also includes a control loop (e.g., the control loop 146 in FIG. 1) adapted to be coupled to: the controller output (e.g., the controller output 148 in FIG. 1); a sense output (e.g., the sense output 126 via the first input 142 in FIG. 1) of the power stage; and an output voltage terminal (e.g., output 128 via the third input 144 in FIG. 1) of the power stage. The control loop includes an off-time controller (e.g., the off-time controller 150 in FIG. 1) configured to: generate an inductor current estimate (e.g., Vsynth in FIGS. 2 and 4); control a slope of the inductor current estimate responsive to a demand signal (e.g., DS1 in FIGS. 1, 2 and 4); compare the inductor current estimate with a threshold (e.g., GND in FIGS. 2 and 4); and assert an on-time initiation signal (e.g., the output of the comparator 218 in FIG. 2, or the output of the comparator 402 in FIG. 4) if the inductor current estimate is equal to or less than the threshold.

In some example embodiments, the demand signal is a first demand signal (e.g., DS1), and the programmable switching converter controller includes an on-time controller with a monostable (e.g., monostable 222 in FIG. 2) configured to modulate Ton responsive to a second demand signal (e.g., DS2). In some example embodiments, the demand signal is a first demand signal, and the programmable switching converter controller includes an on-time controller with an SR latch (not shown) configured to modulate Ton responsive to a second demand signal.

In some example embodiments, the control loop (e.g., the control loop 146 in FIG. 1) is configured to: generate a Ton that is fixed or proportional to a demand signal proportional to a load adapted to be coupled to an output of the power stage; generate a Toff that is inversely proportional to the product of a voltage across the inductor while the switch is off and a demand signal proportional to the load; initiate Ton when Toff elapses; and initiate Ton responsive to an external trigger signal. In some example, the control loop is configured to generate Toff by: charging a capacitor during Ton by a voltage proportional to a current in the inductor; and discharging the capacitor after Ton expires using a current proportional to the product of a voltage across the inductor and a demand signal proportional to the load, wherein Toff is equal to a time interval between the end of Ton and the voltage on the capacitor reaching zero.

In some example embodiments, the off-time controller is configured to control the slope of the inductor current estimate responsive to the demand signal and responsive to: a difference between a voltage at an output voltage terminal (e.g., VOUT at the output 128 in FIG. 1) of the power stage and a voltage at an input voltage terminal (e.g., VIN at the VIN input 121 in FIG. 1) of the power stage. In some example embodiments, the demand signal is a first demand signal (e.g., DS1), and the control loop includes programmable mode circuitry configured to provide: the first demand signal to modulate Toff; a second demand signal (e.g., DS2) to modulate Ton; and an alternative on-time initiation signal for a transition mode and discontinuous conduction mode.

In some example embodiments, the programmable mode circuitry (e.g., the programmable mode circuitry 170 in FIGS. 1 and 2, or the programmable mode circuitry 170A in FIG. 3) includes: an error amplifier (e.g., the error amplifier 302 in FIG. 3) with a first input, a second input, and an output, the first input of the error amplifier coupled to the output voltage terminal (e.g., to receive VOUT as in FIG. 3), the second input of the error amplifier adapted to receive a reference voltage (VREF in FIG. 3), and the output of the error amplifier used as the first control signal (e.g., DS1); and a limiting circuit (e.g., D3 and D4 in FIG. 3 with limits provided by the programmable parameter selection block 304) coupled to the output of the error amplifier and configured to provide a limited version of the output of the error amplifier as the second control signal (e.g., DS2). In some example embodiments, the programmable switching converter controller is configured to control a switch of the power stage to provide power to a load selected from: a gaming adapter, a 400 W-1 kW television, and a 300 W-2 kW telecom equipment.

In some example embodiments, a programmable switching converter controller (e.g., the programmable switching converter controller 140A in FIG. 2, or the programmable switching converter controller 1406 in FIG. 4) includes a controller output (e.g., the controller output 217 in FIG. 2) adapted to be coupled to a switch (e.g., Q1 in FIG. 2) of a power stage (e.g., the power stage 120A in FIG. 2). The programmable switching converter controller also includes a control loop (e.g., the control loop 146A in FIG. 2 with a first loop input (e.g., the first input 219 coupled to the current sense output 211 in FIG. 2), a second loop input (e.g., the third input 213 in FIG. 2), and a loop output (e.g., the output of the monostable 222 in FIG. 2). The first loop input is adapted to be coupled to a current sense output of a power stage. The second loop input is adapted to be coupled to an output voltage terminal of the power stage. The loop output is coupled to the controller output (e.g., the output of the monostable 222 is coupled the controller output 217 in FIG. 2).

In some example embodiments, the control loop includes an on-time controller (e.g., the on-time controller 160 in FIG. 1, or related components in FIGS. 2 and 4) having an on-time controller input (e.g., to receive the on-time initiation signal from the off-time controller) and an on-time controller output (e.g., to output CS1), the on-time controller output is coupled to the loop output. In some example embodiments, the control loop also includes an off-time controller (e.g., the off-time controller 150 in FIG. 1, or related components in FIGS. 2 and 4) having: an off-time controller output (e.g., the output of the comparator 218) coupled to the on-time controller input. The off-time controller also includes an inductor current synthesizer (e.g., the $I_L$ synthesizer 152 in FIG. 1, or related components in FIGS. 2 and 4) with a synthesizer input (e.g., the current sensor 226 or related input in FIG. 2) and a synthesizer output (e.g., a node or terminal with Vsynth coupled to the comparator 218 in FIG. 2). The synthesizer input is coupled to the first loop input (to receive a current sense value related to the switch when active). The inductor current synthesizer is configured to generate an inductor current estimate (e.g., Vsynth) at the synthesizer output responsive to a current sense value (e.g., indicating the amount of current through the switch when active) obtained from the current sense output (e.g., the current sense output 211 in FIG. 2). The inductor current estimate is related to an inductor of the power stage.

In some example embodiments, the control loop also includes a slope controller (e.g., the slope controller 154 in FIG. 1, or related components in FIGS. 2 and 4) with a slope controller input (e.g., one of the inputs of the multiplier circuit 212 in FIG. 2, or the multiplier circuit 406 in FIG. 4) and a slope controller output (e.g., the output of the voltage-to-current converter 214 in FIG. 2, or the output of the voltage-to-current converter 404 in FIG. 4). The slope controller input is adapted to receive a demand signal (e.g., DS1). The slope controller output is coupled to the inductor current synthesizer. The slope controller is configured to control a slope of the inductor current estimate over time responsive to the demand signal.

In some example embodiment, the off-time controller also includes a comparator (e.g., the comparator 218 in FIG. 2) with a first comparator input (the inverting "−" input of the comparator 218), a second comparator input (the non-inverting "+" input of the comparator 218), and a comparator output. The first comparator input is coupled to the synthesizer output. The second comparator input is adapted to receive a threshold (e.g., GND). The comparator output is configured to provide an on-time initiation signal responsive to a value at the first comparator input being equal to or less than the threshold.

In some example embodiments, the on-time controller includes an OR gate (e.g., the OR gate 220 in FIG. 2) with a first input, a second input, and an output, the first input of the OR coupled to the comparator output to receive the on-time initiation signal, the second input of the OR gate adapted to receive an alternative on-time initiation signal for transition mode and discontinuous conduction mode.

In some example embodiments, the demand signal is a first demand signal (e.g., DS1), and the on-time controller includes a monostable (e.g., the monostable 222 in FIG. 2) controlled by a second demand signal (e.g., DS2). In some example embodiments, the demand signal is a first demand signal (e.g., DS1), and the on-time controller includes a SR latch (not shown) controlled by a second demand signal (e.g., DS2).

In some example embodiments, the inductor current synthesizer includes: a current sensor (e.g., the current sensor 226 in FIG. 2) coupled to the synthesizer input; a diode (e.g., D2 in FIG. 2) with an anode and a diode, the anode coupled to the current sensor; and a capacitor (e.g., Csynth in FIG. 2) with a first side and a second side, the first side of the capacitor coupled to the cathode of the diode, and the second side of the capacitor coupled to ground.

In some example embodiments, the slope controller includes: a subtract circuit (e.g., the subtract circuit 210 in FIG. 2) having a first input, a second input, and an output, the first input of the subtract circuit adapted to be coupled to the output voltage terminal (e.g., 128A in FIG. 2) of the power stage, and the second input of the subtract circuit adapted to be coupled to an input voltage terminal (e.g., VIN input 207 in FIG. 2) of the power stage. The slope controller also includes a multiplier circuit (e.g., the multiplier circuit 212 in FIG. 2) having a first input, a second input, and an output, the first input of the multiplier circuit coupled to the output of the subtract circuit, the second input of the multiplier circuit coupled to the slope controller input. The slope controller also includes a voltage-to-current converter (e.g., the voltage-to-current converter 214 in FIG. 2) having a current terminal and a control terminal, the control terminal of the voltage-to-current converter is coupled to the output of the multiplier circuit. The current terminal of the voltage-to-current converter coupled to the inductor current synthesizer (e.g., to control the rate at which Vsynth discharges based on the multiplier output).

In some example embodiments, the control loop is configured to: generate a Ton that is fixed or proportional to a demand signal proportional to a load adapted to be coupled to the output voltage terminal; generate a Toff that is inversely proportional to the product of a voltage across the inductor while the switch is off and a demand signal proportional to the load; initiate Ton when Toff elapses; and initiate Ton responsive to an external trigger signal. In some example embodiments, the control loop is configured to generate Toff by: charging a capacitor (e.g., Csynth in FIG. 2) during Ton by a voltage proportional to a current in the inductor; and discharging the capacitor after Ton expires using a current (e.g., the output of the multiplier 212 in FIG. 2) proportional to the product of a voltage across the inductor and a demand signal (e.g., DS1) proportional to the load, wherein Toff is equal to a time interval between the end of Ton and the voltage on the capacitor reaching zero.

In some example embodiments, the control loop includes programmable mode circuitry (e.g., the programmable mode circuitry 170 in FIG. 2, or the programmable mode circuitry 170A in FIG. 3) having: an error amplifier (e.g., the error amplifier 302 in FIG. 3) with a first input, a second input, and an output. The first input of the error amplifier is coupled to the output voltage terminal (e.g., output 128A to receive VOUT). The second input of the error amplifier is adapted to receive a reference voltage (e.g., VREF in FIG. 3), and the output of the error amplifier used as the first control signal (e.g., DS1). The programmable mode circuitry also includes a limiting circuit (e.g., D3 and D4 in FIG. 3 with limits provided by the programmable parameter selection block 304) coupled to the output of the error amplifier and configured to provide a limited version of the output of the error amplifier as the second control signal (e.g., DS2).

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. A circuit or device that is described herein as including certain components may instead be adapted to be coupled to those components to form the described circuitry or device.

While the example embodiments above utilize nMOS transistors, other example embodiments may utilize pMOS transistors, NPN bipolar junction transistors (BJTs), PNP BJTs, or any other type of transistor. Hence, when referring to a current terminal, such terminal may be an emitter, collector, source or drain. In addition, the control terminal may be a base or a gate.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value.

A circuit or function that is described herein as including certain components or functions may instead be adapted to be coupled to those components or functional blocks to form the described circuitry or functionality. While certain components or functional blocks may be described herein as being implemented in an integrated circuit or on a single semiconductor substrate (or, conversely, in multiple integrated circuits or on multiple semiconductor substrates), such implementation may be accomplished using more or less integrated circuits or more or less semiconductor substrates. The circuits/functional blocks of the example embodiments may be packaged in one or more device packages.

Modifications are possible in the described embodiments, and other embodiments are possible, within the scope of the claims.

What is claimed is:

1. A system, comprising:
   a programmable switching converter controller having:
     a first controller input, the first controller input adapted to be coupled to a current sense output of a power stage;
     a second controller input, the second controller input adapted to be coupled to an output voltage terminal of the power stage;
     a controller output, the controller output adapted to be coupled to a control terminal of a switch of the power stage; and
     a control loop adapted to be coupled to: the controller output; the first controller input, and the second controller input, the control loop including an off-time controller configured to:
       generate an inductor current estimate;
       control a slope of the inductor current estimate responsive to a demand signal;
       compare the inductor current estimate with a threshold; and
       assert an on-time initiation signal if the inductor current estimate is equal to or less than the threshold.

2. The system of claim 1, wherein the demand signal is a first demand signal, and the programmable switching converter controller includes an on-time controller with a monostable configured to modulate an on-time (Ton) interval responsive to a second demand signal.

3. The system of claim 1, wherein the demand signal is a first demand signal, and the programmable switching converter controller includes an on-time controller with an SR latch configured to modulate an on-time (Ton) interval responsive to a second demand signal.

4. The system of claim 1, wherein the control loop is configured to:
   generate an on-time interval (Ton) that is fixed or proportional to the demand signal proportional to a load adapted to be coupled to an output of the power stage;
   generate an off-time interval (Toff) that is inversely proportional to a product of a voltage across the inductor while the switch is off and the demand signal proportional to the load;
   initiate Ton when Toff elapses; and
   initiate Ton responsive to an external trigger signal.

5. The system of claim 4, wherein the control loop is configured to generate Toff by:
   charging a capacitor during Ton by a voltage proportional to a current in the inductor; and discharging the capacitor after Ton expires using a current proportional to the product of a voltage across the inductor and the demand signal proportional to the load, wherein Toff is equal to a time interval between an end of Ton and the voltage on the capacitor reaching zero.

6. The system of claim 1, wherein the off-time controller is configured to control the slope of the inductor current estimate responsive to the demand signal and responsive to: a difference between a voltage at an output voltage terminal of the power stage and a voltage at an input voltage terminal of the power stage.

7. The system of claim 1, wherein the demand signal is a first demand signal, and the control loop includes programmable mode circuitry configured to provide:

the first demand signal to modulate an off-time interval (Toff);

a second demand signal to modulate an on-time interval (Ton); and an alternative ON control signal for a transition mode and a discontinuous conduction mode.

8. The system of claim 7, wherein the programmable mode circuitry includes:

an error amplifier with a first input, a second input, and an output, the first input of the error amplifier coupled to the output voltage terminal, the second input of the error amplifier adapted to receive a reference voltage, and the output of the error amplifier used as the first control signal; and a limiting circuit coupled to the output of the error amplifier and configured to provide a limited version of the output of the error amplifier as the second control signal.

9. The system of claim 1, wherein the programmable switching converter controller is configured to control a switch of the power stage to provide power to a load selected from a gaming adapter, a 400 W-1 kW television, and a 300 W-2 kW telecom equipment.

* * * * *